Feb. 26, 1957

L. C. BRUNSTRUM ET AL 2,782,630

UNIVERSAL PENETROMETER CONE

Filed April 29, 1955

Inventors.
Lawrence C. Brunstrum,
Arthur C. Borg.
By Everett A. Johnson
Attorney.

_United States Patent Office_ 2,782,630
Patented Feb. 26, 1957

2,782,630
UNIVERSAL PENETROMETER CONE

Lawrence C. Brunstrum, Flossmoor, and Arthur C. Borg, Chicago, Ill., assignors to Standard Oil Company, Chicago, Ill., a corporation of Indiana Application April 29, 1955, Serial No. 504,812

8 Claims. (Cl. 73—64)

This invention relates to apparatus for determining the consistency of lubricating greases.

Consistency is the most frequently measured property of a lubricating grease, somewhat analogous to the viscosity of a lubricating oil, and there are well established methods and apparatus for evaluating characteristics of solid lubricants and oils. For example, during the past 30 years, penetration, as described in ASTM D217–52T, has become the international standard for controlling manufacturing operations and specifying purchases of most grades of greases. The instrument heretofore used utilizes a double taper cone which is capable of testing hard-block greases and NLGI grade greases.

However, for the routine testing of semi-fluid greases, softer than NLGI grade 1, there exists no generally acceptable instrument which can be considered equivalent in utility and simplicity of operation to the ASTM cone penetrometer as applied to heavier and block greases. Many attempts have been made to modify the standard tester by using counter-balanced cones and numerous cones of lighter weight and special shapes. None of these prior devices cover the semi-fluid range and are of only limited usefulness.

Recently, an attempt has been made to devise a perforated disc for use on semi-fluid greases. Although reasonably satisfactory for this purpose, such a disc is not usable on the NLGI grades or on the block greases. Obviously, it is very desirable to have a penetrometer test and a penetrometer apparatus which is of equivalent sensitivity in the three general grades of greases and which can be used on all types of greases.

It is, therefore, a primary object of our invention to provide a single, simple, inexpensive device that is capable of testing all greases. It is a further object of the invention to provide an apparatus which may be used in place of the cone now extensively used for the heavier grades. An additional object is to provide a continuous, throuh empirical, scale for all grades without reflections or gaps. Still another object of the invention is to provide an apparatus which gives identical readings with ASTM D217–52T for the grades now standardized by NLGI. An additional object is to provide an apparatus which is adaptable for universal use on the semi-fluid, regular (NLGI grades 0–6), and the hard-block greases. These and other objects of our invention will become apparent as the description thereof proceeds.

Briefly, according to our invention, we provide a cone which in its lower and central portions has a double taper and resembles the standard ASTM cone. The central body portion is a truncated 90° cone and the lower or tip portion is a 30° cone which are now international standards. Thus, with block greases and those regular grades standardized by NLGI, our cone yields results identical with ASTM D217–52T cone. To make possible the testing of semi-fluid greases, we have provided a third or upper portion of the cone which, in horizontal projection, corresponds to a disc having holes in the periphery.

The dimensions of the double tapered cone are important and our invention will be described with reference to a preferred embodiment thereof which is illustrated in the drawings and wherein.

The cone diameter, the vertical height of the cone, and the arrangement and diameter of the flow channels 10 determine the rate of submersion in semi-fluid grease. The behavior of the cone and the penetration indications thereof when used on NLGI grade greases and block greases are the same as with the ASTM cone. In this connection, we have obtained penetration data on the cone designed according to our invention, on the D217 cone, on a 30 gram cone, and on a perforated disc, the latter having been proposed by others for specific use on semi-fluid greases. From these penetration data, it is evident that our universal cone, as described herein, embraces the three groups of greases, i. e. the block greases, the NLGI grades, and the heretofore unstandardized semi-fluid grades. Our cone gives identical readings with the D217 cone in the ASTM standardized range.

Figure 2:
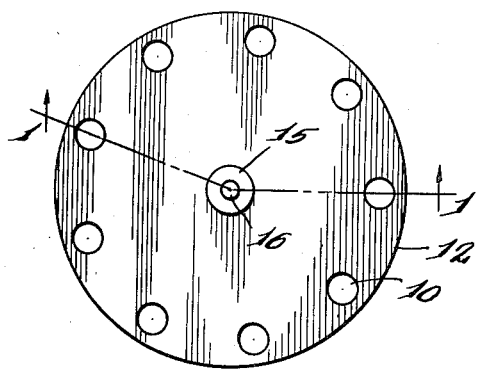
Figure 2 is a plan view thereof.
Figure 1:
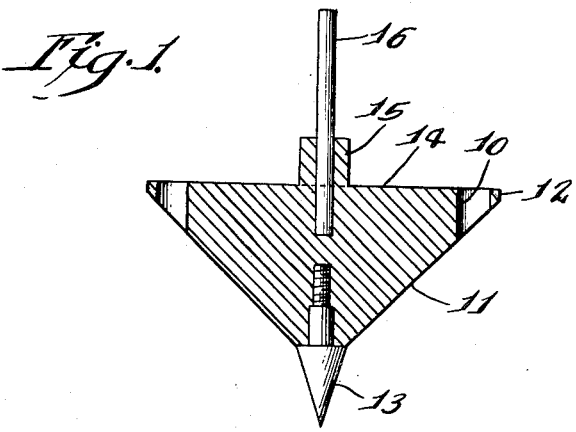
Figure 1 is a vertical section through the improved cone.

Our cone, as shown in the drawings, comprises a central truncated 90° cone portion 11 having a height of between about 1.246 and about 1.226 inches, a skirt 12 which is about 1/16 inch long, and a hardened stainless steel tip 13 comprising a 30° cone having a height of between about 0.580 and about 0.600 inch merging without any shoulder at its base with the narrowest portion of the truncated cone 11. A plurality of 0.25 inch reamed holes providing the flow passages 10 are disposed in a circular array as shown in Figure 2. The base 14 is between about 2.747 and about 2.753 inches in diameter and the flow channels 10 are spaced 40° apart and arranged on a circle having a diameter of between about 2.372 and about 2.378 inches. The shank 15 is integral with the cone assembly and is typically about 0.375 inch high and about 0.375 inch in diameter. The shank 15 accommodates a cone shaft 16 which has a diameter of between about 0.122 and about 0.125 inch for attachment to a penetrometer apparatus.

The total area of the base 14 of the illustrated cone is about 5.939 square inches and the area of the nine flow passages 10 is about 0.4418 square inch. This gives a net area of the cone base 14 of about 5.4977 inches. If desired, this relationship can be obtained by fluting the cone at the periphery to reduce the gross area of the base 14 by an amount equivalent to the area of the flow channels 10. Furthermore, it is contemplated that a double tapered cone adapted for use on all grades and types of greases can be obtained by diminishing the truncated cone 11 height until the base 14 (without the flow passages 10) is reduced in area to approximately 5.498 square inches without changing the selected gross weight of the cone assembly. Thus, the diameter of the base 14 of the cone without the flow passages 10 will be reduced from about 2.75 inches to between about 2.64 inches and about 2.75 inches.

In our preferred embodiment of the invention, we utilize a cone having a total weight of 102.5 grams and, when used in the standard ASTM penetrometer, the falling unit has a gross weight of 150 grams. The test is conventionally made in a cup which is 3 inches in diameter leaving an annulus between the periphery of the base 14 of the cone and the inner wall of the cup (not shown).

In the drawings, we have illustrated the assembly as being solid, but if desired it may be hollow in which event a removable cover (not shown), made for example of plastic, can be placed over the open base 14 of the cone to prevent the cavity's being filled by grease.

The cone is preferably made of a material having a specific gravity of about 1.75 when constructed to the described dimensions and when it is desired to have a weight of approximately 100 grams. We have found that a suitable material is magnesium or aluminum and the shank 15 can be adjusted or trimmed to give the desired standard weight to the cone.

Although the cone assembly has been described as having the shank 15 integral with the cone body 11, it is contemplated that the shank may be a portion of or be carried by the cone shaft 16. In any event the weight of the complete cone assembly including the cone shaft 16 is preferably about 102.5 gms. when used with the conventional ASTM penetrometer shaft.

From the above, it will be apparent that the elements of our device are simple, durable, and readily interchangeable with prior apparatus and it will be apparent that in providing the modified cone we have attained the objects of our invention and have provided an apparatus which is adapted for the rapid routine testing of all types of greases by means of the ASTM penetrometer. The results are easy and readily reproducible and the device is of the desired sensitivity for all types of greases.

Although an embodiment of our invention has been described in some detail, it should be understood that this is by way of illustration only and that the invention is not necessarily limited thereto. Accordingly, modifications of our invention are contemplated without departing from the spirit of the invention.

What is claimed is:

1. A universal penetration cone assembly adapted for use in determining the penetration of lubricating greases which comprises in combination a truncated cone portion, a tip of lesser taper than said cone fixed to the truncated face of said cone, a region of increased frictional resistance to flow adjacent the periphery of said cone, and a shank extending axially of said cone and of said tip, said shank being adapted to be trimmed to the desired gross weight of the cone assembly.

2. The apparatus of claim 1 which includes a cone shaft carried by said shank, and wherein the diameter of the base of said truncated cone is between about 2.64 inches and about 2.75 inches and the weight of the cone and cone shaft is about 102.5 grams.

3. The apparatus of claim 1 wherein said cone has a base of about 2.75 inches in diameter and said region of increased frictional resistance to flow comprises a plurality of flow passages having a diameter of about 0.25 inch placed 40° apart and in a circular array having a diameter of 2.375 inches, and wherein the height of said cone is between 1.30 and 1.28 inches and the length of said tip is between 0.58 and 0.60 inch.

4. A universal penetrometer cone assembly for use in the ASTM D217-52T test and applicable to all grades of greases which comprises in combination a solid truncated cone, a less steeply tapered tip fixed to the truncated apex of said cone, a cylindrical projection extending from the base of said cone, an array of a plurality of uniform flow passages having their axes parallel to the longitudinal axis of said cone at the periphery thereof, a shank of adjustable weight extending longitudinally of the cylindrical projection of said cone, and a bore in said shank adapted to receive the cone shaft.

5. The apparatus of claim 4 wherein said cone has a base of about 2.75 inches in diameter, said flow passages having a diameter of about 0.25 inch are placed 40° apart and are in a circular array having a diameter of 2.375 inches, and wherein the height of said cone is between 1.30 and 1.28 inches and the length of said tip is between 0.58 and 0.60 inch.

6. An apparatus for measuring the penetration of lubricating greases by ASTM standard D217-52T which comprises an inverted truncated cone, an axial shank extending from the plane of the base of said cone, a tip of lesser taper than said cone, and restricted flow means through said cone disposed in a circular array near the periphery of the base of said cone.

7. An apparatus for determining the penetration of lubricating grease comprising in combination an inverted truncated 90° cone, a hardened steel tip on the lower end of said cone, said tip comprising a 30° cone, and restricted flow means adjacent the periphery of said truncated cone, the base of said cone having an area of about 5.94 square inches and the said bores having a total flow area of about 0.44 square inch.

8. A universal penetrometer cone having a solid body portion having the configuration of a truncated 90° cone having a base of about 2.75 inches in diameter, a short cylindrical projection extending from the base of said body portion a distance of about 1/16 inch, an array of nine 1/4 inch flow passages disposed 1/16 inch from the periphery of said skirt in a circular array with their centers on a circle having a diameter of 2.375 inches, a stainless steel conical tip extending from the truncated apex of said body portion a distance of about 0.6 inch, a shank fixed to said body portion, a drilled and tapped bore extending longitudinally within said shank, and a cone shaft threaded into said bore, the gross weight of said assembly being about 102.5 grams.

References Cited in the file of this patent

UNITED STATES PATENTS 2,104,163     McJunkin _____ Jan. 4, 1938

FOREIGN PATENTS 16,997     Great Britain _____ May 2, 1912

OTHER REFERENCES

American Paint & Varnish Manufacturers Association: Scientific Section, circular #300, pages 131–132, January 1927. A copy in Div. 36.